(12) United States Patent
Lammens, Jr. et al.

(10) Patent No.: US 7,504,580 B2
(45) Date of Patent: Mar. 17, 2009

(54) CONDUIT JUNCTION BOX ADAPTER CLOSURE

(76) Inventors: Albert James Lammens, Jr., 758 N. Glendora Ave., Covina, CA (US) 91724; Randy Lamar Marx, 6161 Candlewood Ct., Las Vegas, NV (US) 89108

( * ) Notice: Subject to any disclaimer, the term of this patent is extended or adjusted under 35 U.S.C. 154(b) by 0 days.

(21) Appl. No.: 11/608,202

(22) Filed: Dec. 7, 2006

(65) Prior Publication Data

US 2007/0289765 A1  Dec. 20, 2007

Related U.S. Application Data

(63) Continuation-in-part of application No. 11/368,082, filed on Mar. 3, 2006, now abandoned, which is a continuation-in-part of application No. 11/156,260, filed on Jun. 17, 2005, now abandoned.

(60) Provisional application No. 60/581,963, filed on Jun. 22, 2004.

(51) Int. Cl.
*H02G 3/08* (2006.01)
(52) U.S. Cl. .............................. 174/50; 174/58; 174/63; 220/4.02; 439/535
(58) Field of Classification Search ............ 174/50, 174/58, 63, 480, 481, 66, 67; 220/3.2, 3.3, 220/3.4, 3.5, 3.6, 3.7, 3.9; 439/535; 248/906
See application file for complete search history.

(56) References Cited

U.S. PATENT DOCUMENTS

| | | | | |
|---|---|---|---|---|
| 2,861,705 | A * | 11/1958 | Scott | 220/3.9 |
| 4,936,478 | A * | 6/1990 | Bozdeck | 220/3.92 |
| 6,737,575 | B2 * | 5/2004 | Pyron | 174/50 |

* cited by examiner

*Primary Examiner*—Dhiru R Patel
(74) *Attorney, Agent, or Firm*—Jeffer Mangels; Butler & Marmaro LLP

(57) ABSTRACT

An adapter closure structure for electrical conduit systems of the type having conduit bodies, for which additional conduit access to an in-service conduit junction box can be provided without the need for removing and/or rewiring the in-service junction box. In a first embodiment, a structure is provided in the form of a closure plate having one or more conduit hubs to replace a flat closure plate on one side of a conduit body. In a second embodiment, a second conduit body may be joined to the in-service body utilizing a novel coupling ring. In this alternative embodiment, the second body can provide additional interior working space. In addition the second body may also optionally add one or several additional conduit hubs for added access to the in-service system. In both embodiments, the closure structure is fitted into a female opening of the conduit body for structural integrity.

5 Claims, 5 Drawing Sheets

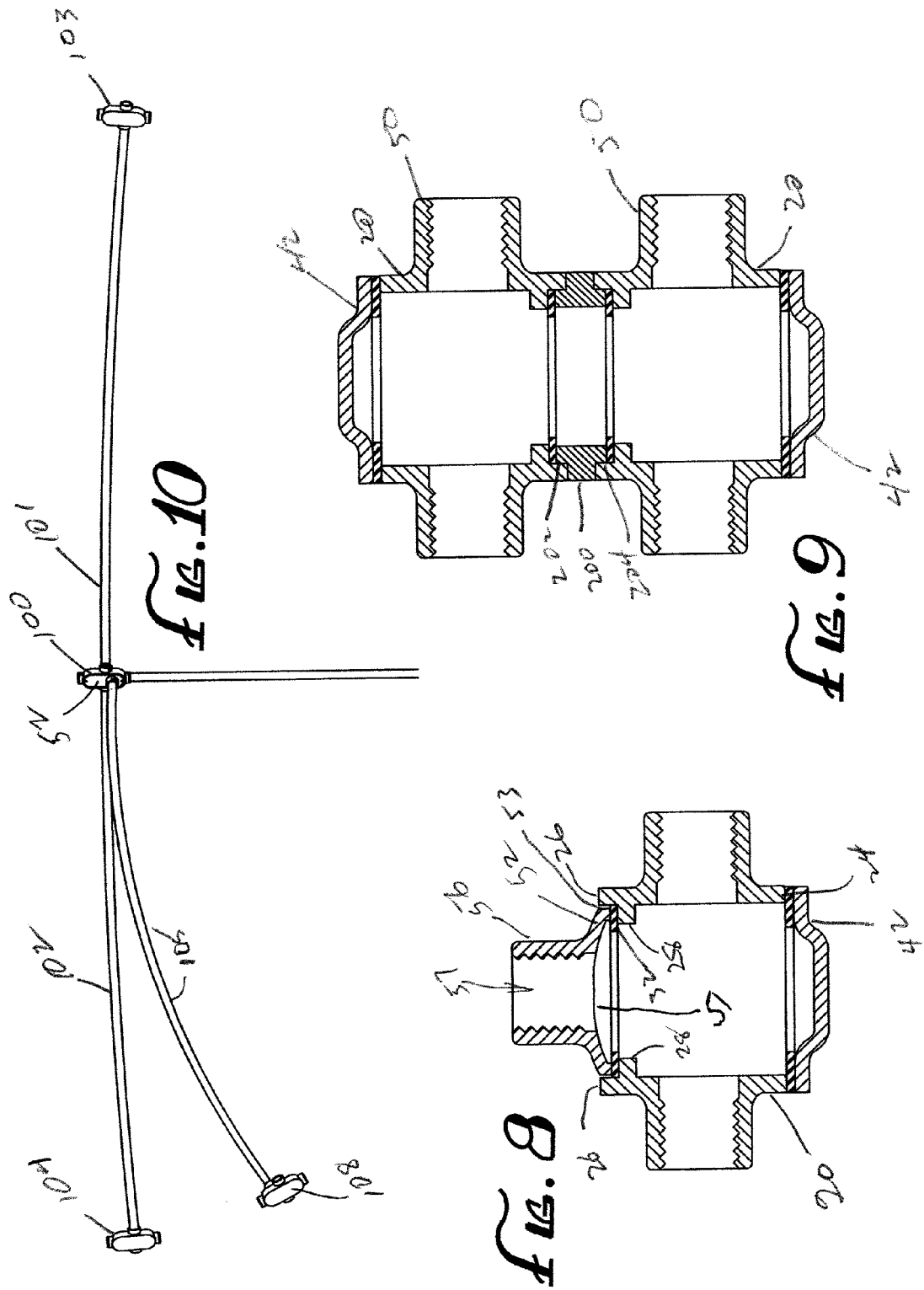

CONDUIT JUNCTION BOX ADAPTER CLOSURE

CROSS-REFERENCE TO RELATED APPLICATIONS

This application is a continuation-in-part of pending U.S. patent application Ser. No. 11/368,082, which is a CIP of U.S. patent application Ser. No. 11/156,260, filed Jun. 17, 2005; which itself claims the benefit of U.S. Provisional Patent Application Ser. No. 60/581,963, filed Jun. 22, 2004.

BACKGROUND OF THE INVENTION

The field of the invention is electrical junction boxes and conduit junction boxes. Conduit junction boxes are a type of electrical junction box. Most building codes require most electrical wiring to be enclosed in conduits which are coupled to one another at junction boxes. A typical junction box has a hollow body with at least one open side. A junction box may have threaded or non-threaded coupling hubs extending through the walls of the box and an interior space that is accessible through an open side of the box. The coupling hubs provide the point of connection between the conduit and the junction box. Electric conductors or wires extend through the conduit into the junction boxes where they are commonly spliced or joined. The open side of a junction box is then closed with a removable cover that is usually attached to the body of the junction box with screws or other fasteners. Examples of prior electrical conduit systems and junction boxes are described in U.S. Pat. Nos. 1,741,358; 2,208,558; 2,398,782; 4,936,478; and my U.S. Reissue Pat. No. RE 35,075.

A common shape for a conduit box is one with a generally rectangular or oblong body, one open longitudinal side, curved ends, and coupling hubs at one or more various locations on the body. The oblong shape increases the ease of routing and pulling wire through the conduit and into the junction box, and the elimination of sharp or jagged edges prevents damage to the wire's insulation by preventing snagging. Conduit bodies are assigned various series or type designations (such as LL, LB, LR, T, X, E, and C) which specify the number and locations of these coupling hubs. These specifications which also include dimensions, interior volume, and maximum numbers of conductors as are more fully set forth in Article 370 of the National Electrical Code (NEC) Hand Book, Twenty-Fourth Edition, published by the National Fire Protection Association which is incorporated herein by reference.

Other configurations of conduit boxes not specified by the NEC Hand Book are in use. Boxes in use include those having a configuration which is square, cylindrical, hexagonal and so on. While the present invention describes an adapter cover and assembly directed to the Hand Book configuration, it is contemplated that the present invention is readily adaptable to these other shapes of boxes and is not limited to the NEC shapes alone.

Conduit bodies form a special subset of conduit systems. The inside of a conduit body is accessed through the removable cover. Large cast or sheet metal boxes are not classified as conduit bodies. Conduit bodies cannot be concealed or buried underground. Under the National Electrical Code, they must be either above ground or, if underground, must be accessible at all times. They can be installed indoors or outdoors and in damp locations, are dust proof and are coated inside and out to prevent corrosion.

A conduit body's coupling hubs provide the connection interfaces with the conduit. Coupling hubs are a fixed feature on the conduit body. Because the location and orientation of the coupling hubs are fixed, the modification of or addition of more conduits to an in-service conduit body can only be achieved by removing and replacing the conduit body with one possessing a more favorable coupling hub configuration. Removing and replacing the conduit body would require undoing all of the wiring connections and rewiring the connections inside the new conduit body, which is a costly and time-consuming operation. The other option is to add an extension box, which would not require removal and rewiring the in-service conduit body. This is the substance of my U.S. Pat. No. Re 35,075. However, this is may not always be the most efficient or economical means if for example, one is adding only one new conduit to an existing system because an extension box also contains a large interior space and usually multiple coupling hubs; hence unnecessary additional structure would be involved. An example of the use of extension boxes may be seen in my U.S. Pat. No. RE 35,075. A much more efficient, cost-effective, and streamlined result is achieved by the present invention; and that is particularly the case where my extension box has been employed as the in-service junction box, as my previous patent suggests as an alternative use thereof. Other variations of the present invention provide other alternatives.

SUMMARY OF THE INVENTION

One embodiment of the present invention provides an efficient and cost-effective means of adding one or perhaps two coupling hubs at different locations or orientations or another type of electrical pass-through interface to an existing junction box of the design disclosed in my U.S. Pat. No. Re 35,075. A structure which includes an adapter closure plate can be installed on my new in-service conduit boxes. The result is an increase in the number, location, and orientation of the coupling hubs on an in-service conduit body. The adapter closure is designed so that the conduit body will provide shear support to the adapter plate. This is achieved by shaping the adapter cover to achieve a tight, recessed fit within the female opening of the conduit body. Providing this form of lateral support will prolong the life of the screws by reducing the resultant shear force on the screws from lateral loading and prevent screw failure that could result from excessive shear strain and/or stress enhanced corrosion. Providing this lateral support will obviate difficult and costly repairs to the conduit box that could result from the shear failure of the screws. Lateral loading could be the result of either misalignment between the coupling hub and the electrical conduit, or a result of lateral forces applied to the electrical conduit and transferred to the adapter closure through the coupling hub.

To further enhance lateral support against shear forces, and to rigidify the adapter cover against bending and/or torsional forces, it is contemplated to form the cover plate so that the underside is slightly concave seen as arcuate in cross-section. As will be more specifically described hereinafter, this arcuate configuration of the cover plate in cooperation with the recessed fitment of the plate within the female opening of the body significantly increases resistance to shear forces.

The adapter closure can be installed on all types of conduit bodies, including series LL, LR, T, X, E, and C, without drilling, tapping, or otherwise modifying the conduit body. Because my new conduit bodies have a front and a rear opening, they are not adaptable to the LB series bodies which include a hub configuration for the body bottom. My new adapter closure plate includes a structure having a front and back surface, sides, and at least one coupling hub or other electrical connection or pass-through interface which protrudes from or is located on the front surface. A water, vapor, and dust tight seal is achieved by installing a gasket between the closure plate and the conduit box body.

The conduit extension body of my U.S. Pat. No. Re 35,075 has a front side and a back side. The front side, by virtue of the recessed portion, provides what is referred to as a female opening; whereas the back side can be referred to as having a male side. While my previous patent disclosed the concept of coupling my new box to prior-art conduit junction boxes so as to perform as an extension; also disclosed is the use of my new conduit extension boxes as in-service junction boxes rather than as an extension. For some situations, the adapter closure of the first embodiment disclosed herein provides a convenient means of adding one or possibly two additional conduits to an in-service conduit system.

However, at times there are many wires in the conduits, and the addition of more conduits can exacerbate crowding inside the conduit body. There also may be instances where additional wires may be added through the existing conduits, likewise tending to over populate the interior. In such cases the adapter closure plate structure may not provide an optimal solution, as more interior space may be needed.

For such instances, an alternative embodiment of the present invention provides structure for gaining more interior space for an in-service conduit box; and has the option for also adding more additional conduits to an in-service conduit installation. Disclosed herein are new structures for attaching two of my extension boxes together by joining the female sides together. This provides an alternative way of providing additional conduits to an in-service conduit body, and also for increasing interior working space when needed. This embodiment has the added advantage that more than two new conduits may be added depending upon which hub configuration series is selected for the added body.

U.S. Pat. No. 4,936,478, shows a conduit box having multiple open sides, and teaches the concept of adding one or more conduit coupling hubs by attaching them to a conventional flat cover plate. For reasons more completely set forth herein, such a combination is unsatisfactory as it fails to provide adequate support for shear forces.

In summary, my U.S. Pat. No. Re 35075 teaches that more conduits may be added to an in-service system by coupling one or more of my extension boxes to a prior art conduit body by mating in tandem the female side of one such box to the male side of another. In the alternative, U.S. Pat. No. RE 35,075 teaches to use my extension box as the junction box itself, closing both the female and male sides with conventional flat plate covers.

It is an object of the present invention to provide structure for adding one or more conduits to an in-service junction box of the design disclosed in U.S. Pat. No. Re 35,075.

It is also an object of the present invention to provide structure permitting the addition of one or more conduits to an in-service junction box wherein increased support against shear forces is provided for the added conduits.

It is a further object of the present invention to provide structure for joining conduit boxes together in order to provide additional conduits to an in-service assembly and to also add additional interior working space.

Other objects and features of the invention will become apparent from the following detailed description when studied in connection with the accompanying drawings. It is to be understood, however, that the drawings are designed for the purpose of illustration only and are not intended to define the limits of the invention.

BRIEF DESCRIPTION OF THE DRAWINGS

FIG. 8 is a cross-sectional view of an assembled junction box of the present invention employing an adapter closure structure including a conduit hub, taken along line 8-8 of FIG. 4.

FIG. 9 is a sectional view of FIG. 7 taken along line 9-9 showing two of conduit bodies connected together.

FIG. 10 is a representation of a typical conduit system employing a number of conduit junction boxes including one conduit connected to a conduit body which employs the adapter closure plate structure of the present invention.

DETAILED DESCRIPTION OF THE PREFERRED EMBODIMENT

Figure 1:
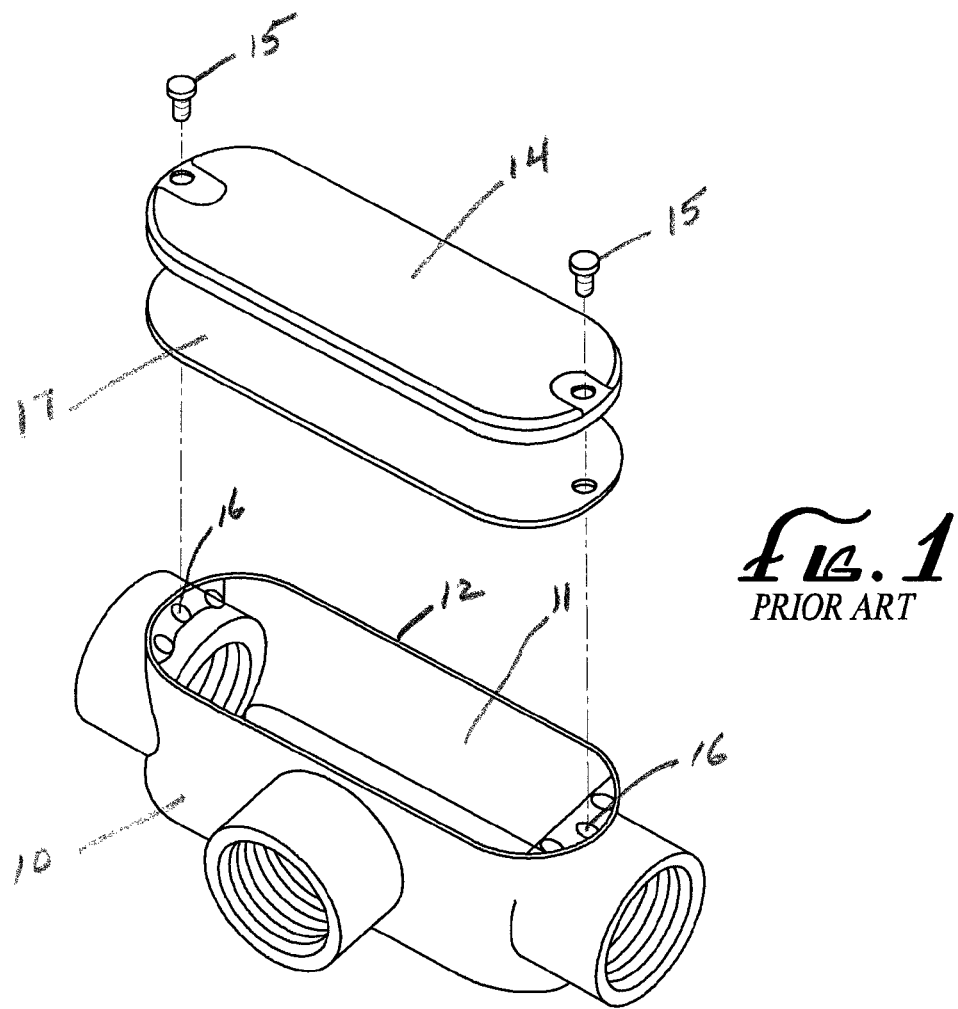
FIG. 1 is a three-dimensional exploded perspective view of a conventional conduit body with a conventional removable cover plate, which is prior art of the present invention.

Referring now in detail to the drawings, FIG. 1 is an illustration of a prior art conduit box. The assembly shown in FIG. 1 comprises a NEC "T" type box 10 with a hollow interior 11 and having an opening 12 through which the hollow interior is accessible. This conventional type box is closed with a flat cover plate 14, which is secured to body 10 by removable threaded fasteners 15, which are received in threaded apertures 16 in the body 10. The removable cover 14 seals the interior 11 of the box by means of gasket 17 placed intermediate the cover 14 and the rim 12.

Figure 2:
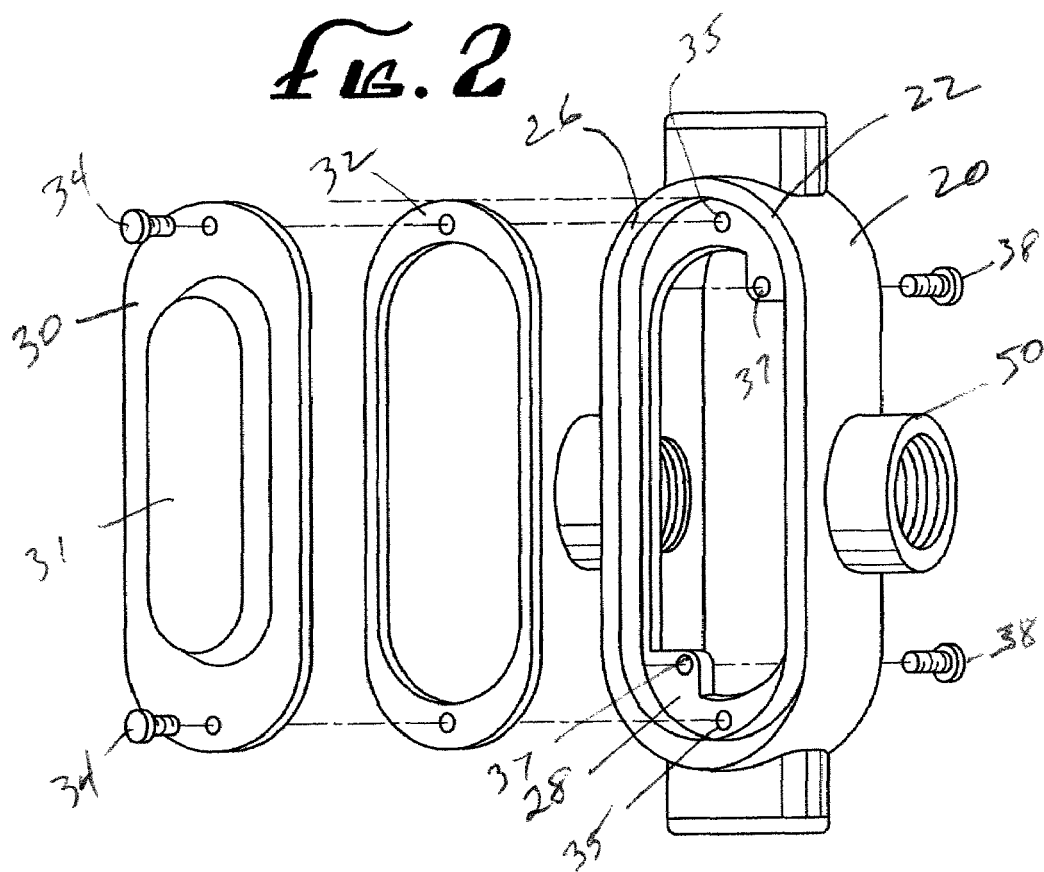
FIG. 2 is a three-dimensional exploded perspective view of a conduit body of the present invention employing a front closure plate for the female opening of the conduit body as an in-service junction box.
Figure 3:
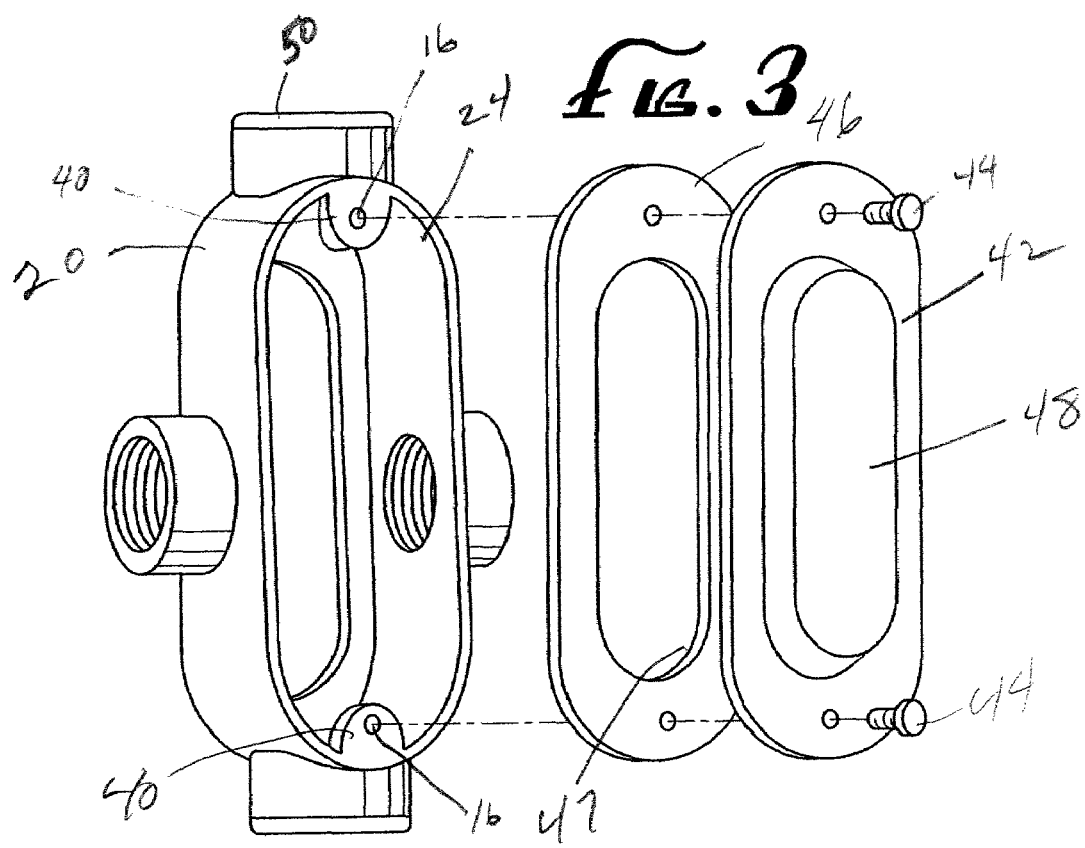
FIG. 3 is a three-dimensional exploded perspective view of the conduit body showing the cover plate for the rear side of the in-service box.

FIGS. 2 and 3 illustrate a modified form of conduit junction box comparable to that shown in FIGS. 1 and 2 of my U.S. Pat. No. RE 35,075. In contrast to the utilization of my new conduit body as an extension box as disclosed in U.S. Pat. No. RE 35,075, FIGS. 2 and 3 of the present invention demonstrate the use of my conduit junction body in an in-service installation or, in other words, as the primary junction box itself. As seen in FIG. 2, my conduit box consists of hollow body 20 with an open front 22 and an open back 24 through each of which the body interior is accessible. The open front 22 of body 20 has an extended rim 26 forming the periphery of opening 22. Below the edge of rim 26 is an extended flange forming a partial floor 28 leaving a central opening into the hollow body. The combination of the rim 26 and partial floor 28 form the female opening for this side of the body 20. A closure plate 30 and gasket 32 are used to close the opening 22 of body 20 utilizing threaded fasteners 34 adapted to be received in apertures 35 appropriately situated in the floor plate 28. Additional threaded apertures 37 are provided in floor 28 and threaded fasteners 38 are also provided for the affixation of ground wires as part of a completed electrical circuit within the interior of body 20.

Turning to FIG. 3, body 20 has a rear opening 24 provided with bosses 40. The means of closing the open back 24 of body 20 is similar to that shown in the prior art of FIG. 1 in that a flat or an embossed cover plate 42 is attached to the open side 24 using threaded fasteners 44 received in apertures 16 formed in the bosses 40. Similar to the prior art closure, a gasket 45 is placed intermediate cover plate 42 and opening 24. Gasket 46 may be a full oval gasket 17 in FIG. 1 conforming to the oval shape of the open side 24 or may have a central opening forming a ring-like structure as shown in FIG. 3. A conventional plain flat gasket similar to gasket 16 could be employed on the back closure at 24. Gasket 46 is shown with an opening at 47 to accommodate the raised or dome portion of cover plate 42 shown at 48. This dome portion of cover plate 42 provides additional interior space for spliced electrical conductors and wires inside the body 20. The dome portion also provides structured rigidity to plate 42.

A number of coupling hubs 50 are shown on body 20, FIGS. 2 and 3 show a conduit body with four coupling hubs for illustrative purposes only. It is to be understood that there are numerous configurations of coupling hubs as set forth in the NEC Hand Book which can provide different configurations and locations for connecting conduits. A coupling hub typically provides an axial opening to the interior of the conduit body and may be threaded or unthreaded depending upon the type of installation. Closure plate 30 may be provided with a dome portion 31 similarly providing extra interior space for the wiring that will be placed inside of body 20.

Hence, FIGS. 2 and 3 show my conduit junction box body adapted for use as a standalone or in-service junction box having a plurality of conduit hubs so that my improved conduit body can be used as a primary junction box.

Figure 4:
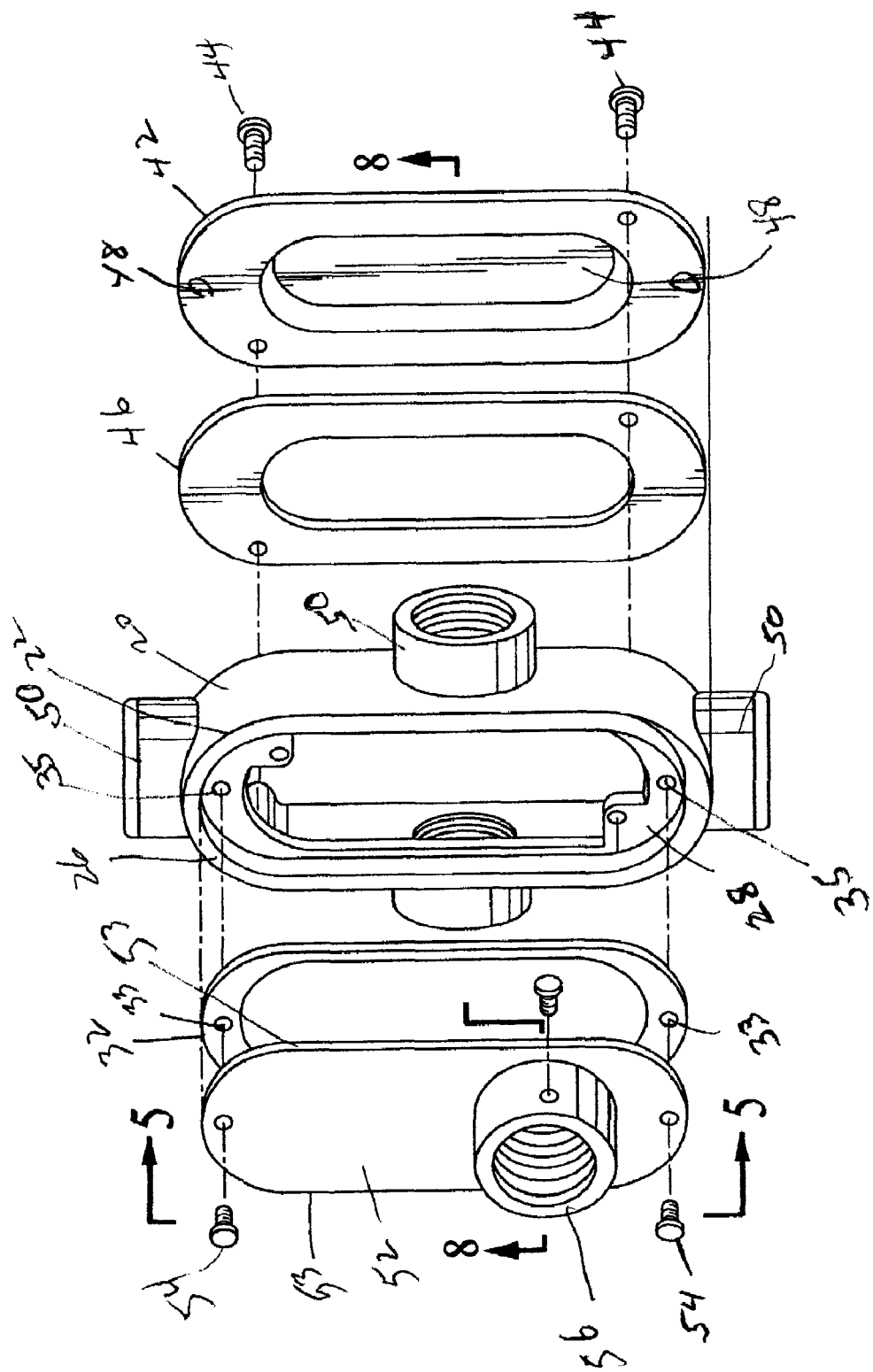
FIG. 4 is an exploded perspective view of the extension box which when used as an in-service junction box is also provided with an adapter closure structure to be fitted to the female side of the box and utilizing a conventional flat cover plate for the rear side of the box.

FIG. 4 illustrates the structure of the first embodiment of the present invention replacing closure plate 30 of FIG. 2. This first structure includes an adapter closure plate 52 sized so that its edges 53 fit snugly within the interior of rim 26 of the female opening 22 of body 20 against partial floor 28. Adapter closure plate 52 is removably affixed to body 20 by fasteners 54, which extend through apertures 33 in gasket 32 and are received in threaded apertures 35 of body 20 in a fashion similar to the manner in which closure plate 30 was affixed to body 20. Here, however, adapter closure plate 52 is provided with a coupling hub 56. Similar to hubs 50 provided on body 20, adapter hub 56, provides another axial passage to the interior of body 20. Electrical conduit may therefor be connected to hub 56 in a conventional manner as such conduits may be connected to the other hubs 50 on body 20. It would be apparent that the adapter closure 52 having a single hub may be fitted to the body 20 in the manner shown in FIG. 4 or may be rotated 180° so that hub 56 is nearer the top of body 20 as seen in FIG. 4 depending upon the desired manner in which the electrical conduit system is assembled and for the convenience of the manner in which wires are spliced together in the interior of body 20. The back side 24 of body 20 is closed in the same manner as shown in FIG. 3 employing back closure plate 42, fasteners 44 and gasket 46.

Turning to FIG. 10, a typical conduit system is illustrated. This assembly could include a conduit box 100 to which are affixed conduits 101 and 102 as shown. Each of conduits 101 and 102 have at their other extremities other typical conduit bodies 103 and 104, respectively. Conduit box 100, however, is illustrated to be of the type to which an adapter closure plate 52 has been installed as described in FIG. 4. Attached to the hub on adapter closure 52, a conduit 105 is shown, which may be several feet (as much as ten feet) in length before it reaches another conduit box 108. What is demonstrated in FIG. 10 is a feature of the present invention. The fitment of the adapter closure plate 52 within the female opening of the body. i.e., within the recess formed by rim 26 and partial floor 28, and the affixation of the closure plate 52 to the floor 28 of body 20 provides significant support for closure plate 52. Lateral forces on, for example, conduit 105 or body 108, would place a load on plate 52 via the conduit hub. The structural integrity of the assembly, however, would not depend merely on fasteners 34 or 54 to retain the cover or closure plate 52 in place. Instead, the rim 26 and the floor 28 provide closure plate 52 with significant lateral support to resist loading or shear forces, which will take some of the load off of fasteners 54 providing considerable support against shear forces.

Figures 5, 6, 6A:
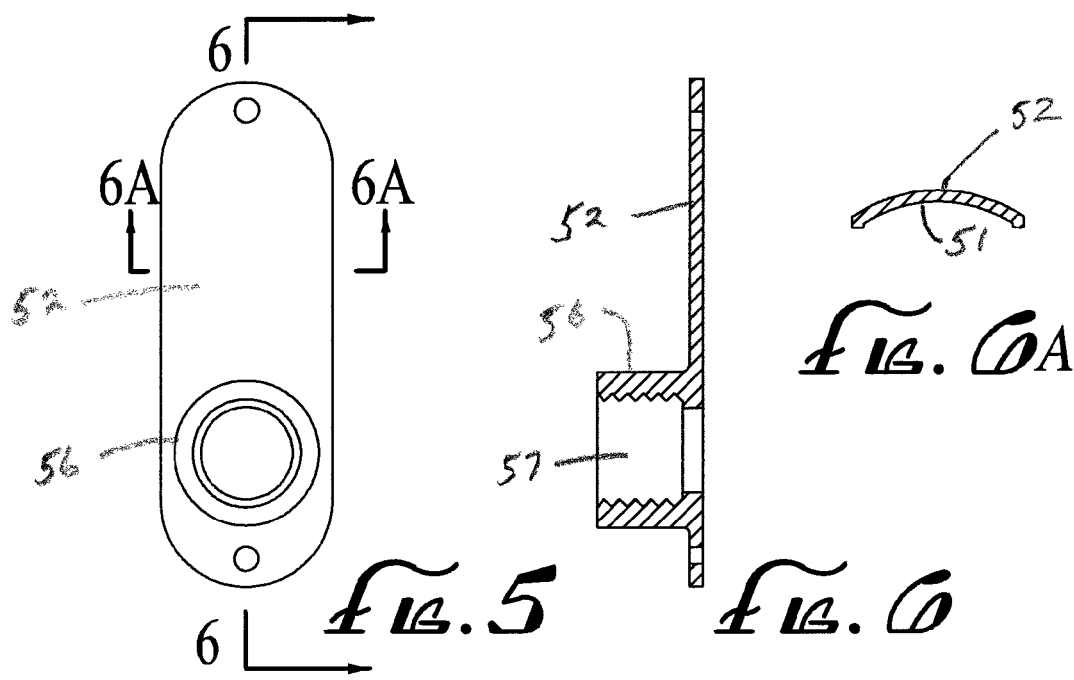
FIG. 5 is a plan view of the adapter structure taken along line 5-5 of FIG. 4.
FIG. 6 is a sectional view of the adapter structure of the present invention taken along line 6-6 of FIG. 5.
FIG. 6a is a transverse cross-sectional view of another embodiment of the adapter structure.

FIG. 5 is a plan view of the closure plate 52 of the present invention showing a single adapter hub 56 and FIG. 6 is a sectional view of the adapter closure plate 52 showing the hub 56 with its axial opening 57 providing access to the interior of a body 20.

FIG. 6a is a transverse cross-section of a preferred embodiment of adapter closure plate 52. In this view, this embodiment illustrates that the flat plate is arcuate on the underside 51 providing a form of dome configuration. The dome portion increases the rigidity of plate 52 significantly, against both bending and torsional forces. This enhances the sealing ability of the plate around the periphery of the plate in the areas away from the location of the fasteners 54. More important, the dome at 51 materially enhances the plate's resistance to shear forces if applied to the hub 56.

FIG. 8 is a sectional view of the conduit body 20 with the adapter structure including closure 52 in place, showing the added hub 56 which comes with the closure plate 52 providing axial access therethrough to the interior of body 20 through opening 57. FIG. 8 further shows the fitment of the edges 53 of closure plate 52 snuggly within the recess formed below the edge of ridge 26 of body 20; and that the edges 53 of closure 52 are situated and supported by the partial floor 28. FIG. 8 also shows the arcuate underside 51 of plate 52. This assembly provides, in the manner set forth above, the lateral resistance to shear forces providing structural integrity by this adapter closure structure for an exemplary installation as illustrated in FIG. 10. FIG. 8 further shows a back plate 42 in place against the open back portion 24 of body 20.

In this manner, an improved conduit structure is provided where the electrician may add a conduit to a conduit junction box while in-service. It is likewise contemplated that two conduit hubs could be applied to closure plate 52 to provide two additional conduit connections if desired. However, it may occur that the number of wires added by this adapter structure may over-populate the interior of the body 20, the raised domes of the cover plates may not suffice to overcome the population growth and additional interior space may be necessary to accommodate the modifications desired by the electrician. Moreover, the designer of modifications to an in-service system may desire to add more conduits than a closure plate can accommodate. In such instances, I have disclosed herein further modifications of the closure structure to accommodate such needs.

Figure 7:
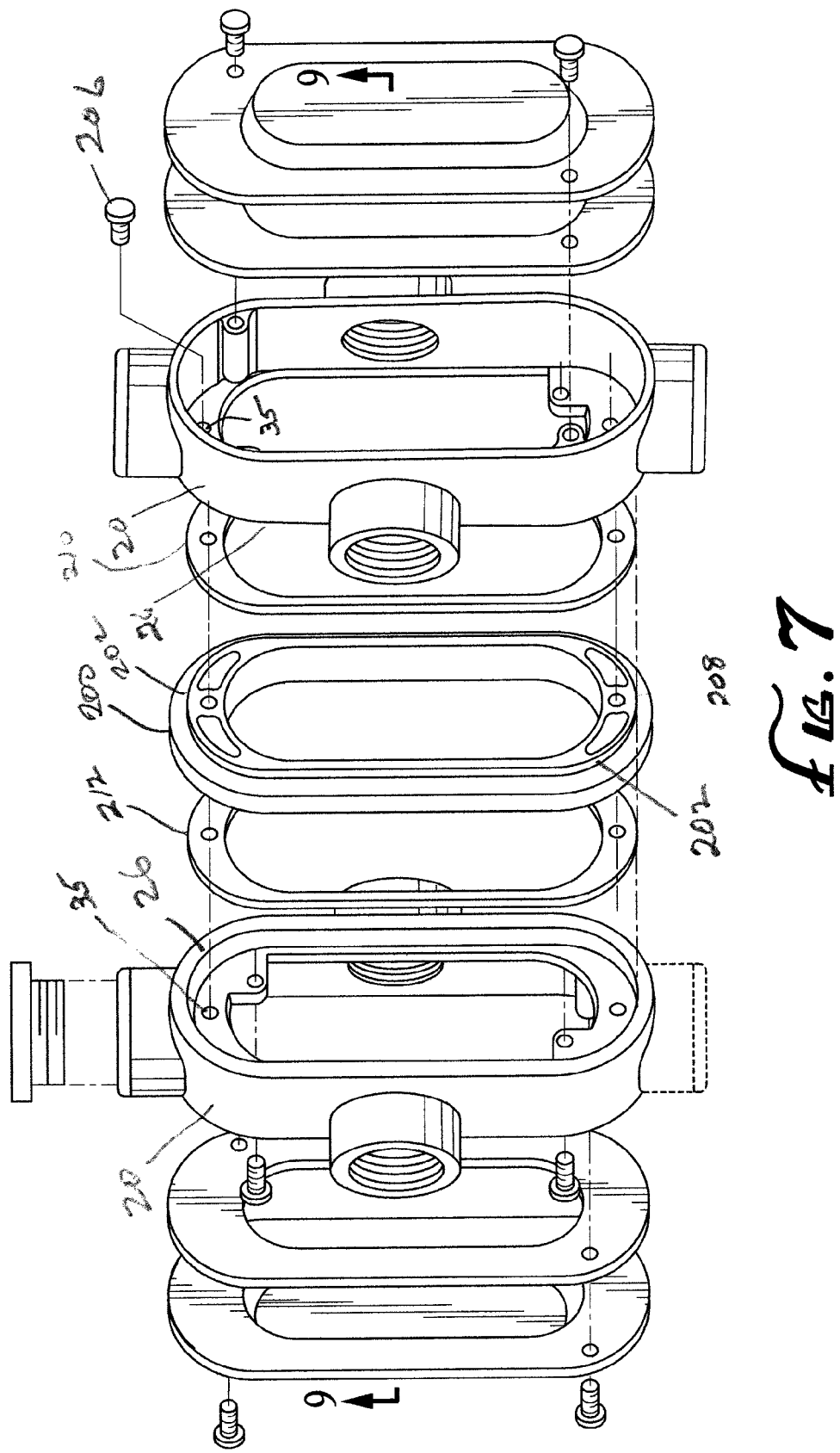
FIG. 7 is an exploded perspective view of a second embodiment of the present invention for adding interior space and additional conduits, employing as the closure structure a coupling ring for joining together the female sides of two conduit junction boxes.

An electrician making a new or adapting an existing conduit assembly may, instead of adding one or two hubs by the utilization of a closure adapter plate such as 52 may desire for a particular installation to have more than two hubs; or simply need more interior space for existing conduits, as mentioned. In such a situation, my invention provides structure for coupling other, similar types of my conduit bodies together by the utilization of the adapter structure shown in FIG. 7. FIG. 7, shows conduit bodies 20 wherein their female openings 26 are oriented facing one another. Adapter ring 200 is provided with extension ridges 202 and 204 on each side thereof as may also be seen in the sectional view in FIG. 9. Hence, adapter ring 200 has an outer periphery which is designed or sized to align with the outer edge of rims 26 of bodies 20 and the interior ridges 202 and 204 of adapter ring 200 are sized to fit within the rim 26 of each of the conduit bodies 20, that is within the female openings of similar conduit bodies.

For this installation, elongated fasteners 206 are provided to extend through apertures 35 of each of the bodies 20, through apertures 208 of adapter ring 200 and through appropriate apertures of the gaskets 210 and 212, which are positioned on each side of adapter ring 200. In this manner two conduit bodies 20 may be affixed to one another with adapter ring intermediate them.

The back sides 24 of each of the bodies 20 are then in turn closed by the cover plates 42 of the same type and configuration as shown in FIGS. 3 and 4. This installation is shown in FIG. 9. Although the bodies 20 shown in the drawings have four conduit hubs each, it is well-known that conduit bodies have one or a plurality of conduit hubs positioned in different places in the side walls of a conduit body. FIG. 7 shows that by coupling two conduit bodies each having four hubs to one another with the utilization of the adapter ring 200 provides a conduit junction having eight conduit hubs. In FIG. 7, however, some of the hubs are shown in phantom line to indicate that various numbers and locations of hubs for an added body are contemplated, and some of the hubs may be sealed with knock-out tabs for later use where desired, assuming local building codes permit them.

The combination of the rim 26 on each of the female openings of the conduit body is fitted snuggly by the coupling ring 200, which thereby provides strength and support to the assembly so that it may resist lateral or shear forces, which might be subjected to the installation; particularly where the conduit bodies are supported entirely by conduit; in contrast to mounting the conduit bodies to a wall or other support. As mentioned, the conduit bodies are designed to accommodate most configurations of conduit bodies, including those known as types LL, LR, T, X, E and C types.

Conduit bodies, although they generally constructed of electrically conductive materials to provide electrical grounding integrity reducing the risk of electrical shock in case of a ground fault, are also sometimes formed of non-conductive materials. In such instances, internal grounding connections, as previously mentioned, are provided within the interior of the bodies 20, typically as shown at 21 in FIG. 4. These ridges of partial floor 28 are provided with threaded apertures for the connection of ground wires to connect to the ground wire typically found in electrical wiring. Likewise, the fasteners 50, which extend through the cover plates of the adapter closure or the threaded fasteners 44, which extend through the rear closure plates 42, provide electrical conduction throughout the body 20 so that the entirety of the structure is electrically integral and, therefore, no portion of the assembled body, regardless of the types of cover plates, will have any electrical circuit fault or interruption, regardless of the sealing nature of the gaskets 32 or 46.

It is to be understood that, while preferred embodiments of the present invention have been disclosed herein, various changes and modifications can be made in carrying out the present invention without departing from the spirit and scope thereof. Such changes and modifications are to be considered as part of the present invention.

What is claimed is:

1. An adapter closure plate for an electrical conduit junction body of the type having a female opening defined by a peripheral rim having a top edge and an extended flange forming a partial floor spaced downwardly from the top edge of the peripheral rim and oriented generally perpendicular to said rim, wherein the adapter closure plate is adapted to be mounted in said female opening and dimensioned to engage said peripheral rim and said partial floor, wherein the adapter closure plate is adapted to engage the peripheral rim at a point below the top edge; wherein the adapter closure plate further includes attachment means for removably affixing said adapter closure plate to said junction body.

2. The adapter closure plate of claim 1 further comprising at least one conduit hub.

3. The adapter closure plate of claim 1 wherein said plate further comprises an outer surface and an inner surface, said inner surface being arcuately shaped.

4. The adapter closure plate of claim 1 wherein said plate is arcuately shaped.

5. A coupling ring for electrical conduit junction bodies of the type having a female opening defined by a peripheral rim and an extended flange forming a floor spaced from and generally perpendicular to said rim;

the coupling ring comprising a first extension ridge dimensioned to engage the peripheral rim and the adjacent partial floor of said female opening of a first conduit body, said coupling ring having a second extension ridge dimensioned to engage the peripheral rim and the partial floor of a second conduit body, and fastening means for removably affixing said first and second conduit bodies together with said coupling ring intermediate said first and second conduit bodies.

\* \* \* \* \*